US006900918B2

United States Patent
Orcutt et al.

(10) Patent No.: US 6,900,918 B2
(45) Date of Patent: May 31, 2005

(54) TORSIONALLY HINGED DEVICES WITH SUPPORT ANCHORS

(75) Inventors: John W. Orcutt, Richardson, TX (US); Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/335,623

(22) Filed: Jan. 2, 2003

(65) Prior Publication Data

US 2004/0004749 A1 Jan. 8, 2004

Related U.S. Application Data

(60) Provisional application No. 60/394,321, filed on Jul. 8, 2002.

(51) Int. Cl.[7] .............................................. G02B 26/08
(52) U.S. Cl. ...................... 359/224; 359/198; 359/199; 359/201; 359/202; 347/260
(58) Field of Search ................................ 359/201–202, 359/223–226; 347/257, 259, 260

(56) References Cited

U.S. PATENT DOCUMENTS

| 5,583,688 A | 12/1996 | Hornbeck | ................... 359/291 |
|---|---|---|---|
| 5,969,465 A * | 10/1999 | Neukermans et al. | ........ 310/333 |
| 5,982,528 A | 11/1999 | Melville | ...................... 359/224 |
| 6,069,725 A | 5/2000 | Melville | ...................... 359/212 |
| 2004/0004775 A1 * | 1/2004 | Turner et al. | |

* cited by examiner

*Primary Examiner*—James Phan
(74) *Attorney, Agent, or Firm*—William B. Kempler; W. James Brady, III; Frederick J. Telecky, Jr.

(57) ABSTRACT

A functional surface, such as a reflective surface, is supported by a pair of torsional hinges for pivoting about a first axis which in turn is supported by a pair of anchors, according to one embodiment. The reflective surface may be driven into resonant oscillations about the first axis by inertially coupling energy to the device. According to a dual axis embodiment, the reflective surface is attached by torsional hinges to a gimbals portion which in turn is attached to the support members by a second pair of torsional hinges which are orthogonal with the first pair of hinges so as to provide for pivoting of the surface about both pairs of torsional hinges. Thus, a light source may be reflected from a reflective surface to produce a beam sweep and moved orthogonally by the gimbals portion. The devices may be etched from silicon.

5 Claims, 15 Drawing Sheets

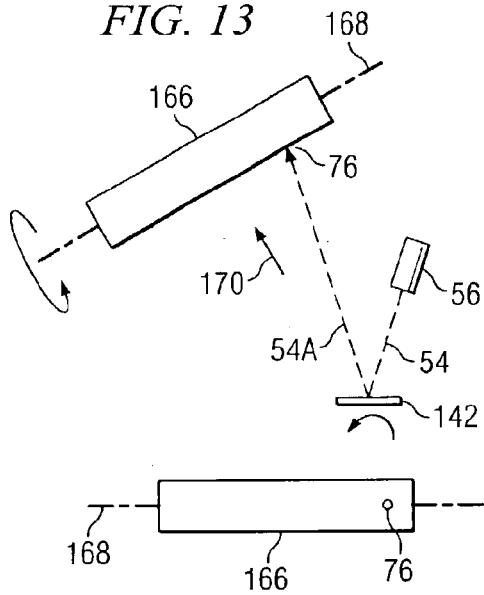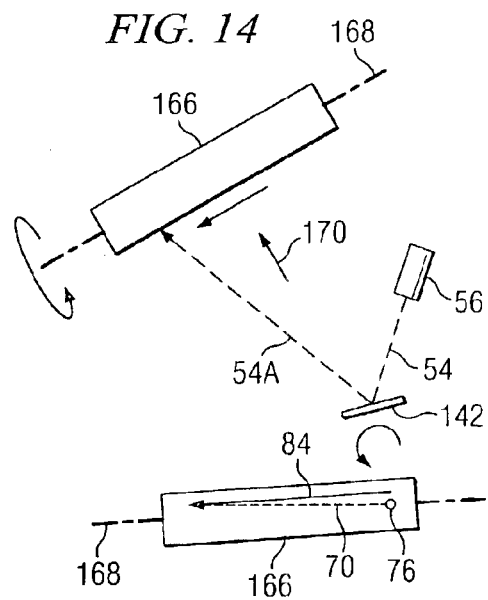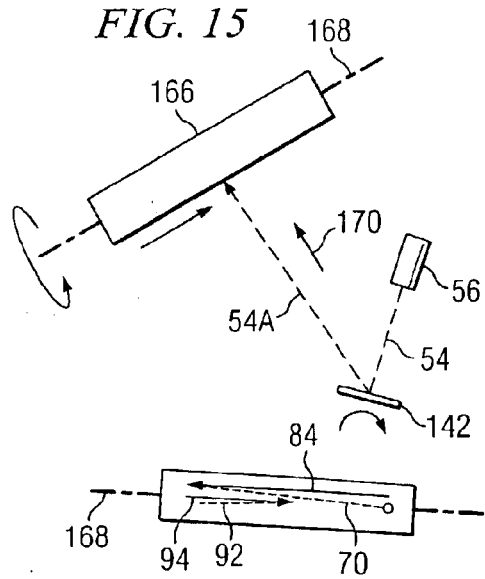

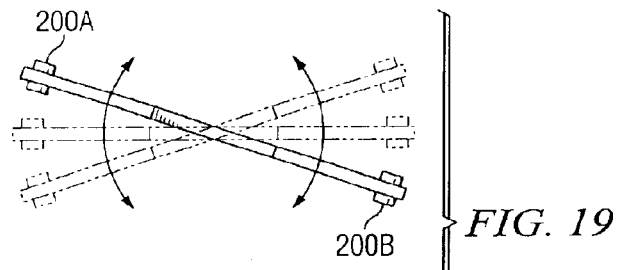
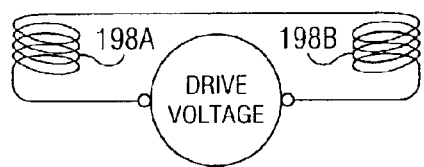
*FIG. 19*
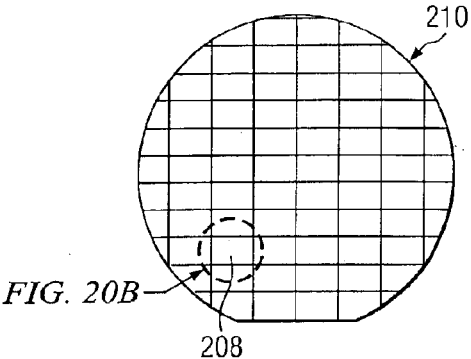
*FIG. 20A*
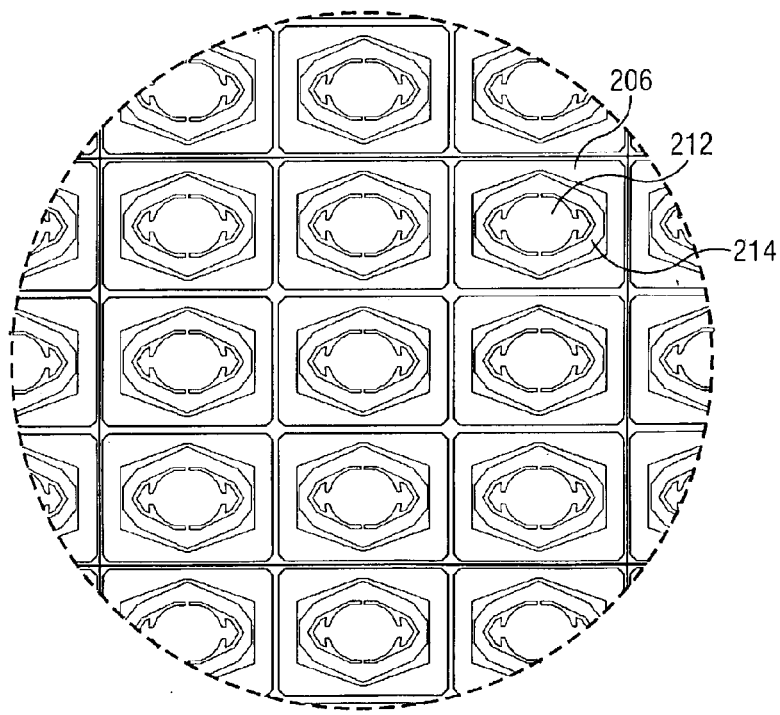
*FIG. 20B*

TORSIONALLY HINGED DEVICES WITH SUPPORT ANCHORS

This application claims the benefit of U.S. Provisional Application No. 60/394,321, filed on Jul. 8, 2002, entitled Scanning Mirror, which application is hereby incorporated herein by reference.

TECHNICAL FIELD

The present invention relates to the use of MEMS (micro-electric mechanical systems) type devices (such as torsional hinge mirrors that are used to provide movement of a light beam on a display screen or on a photosensitive medium). Movement of the device may be controlled in two directions by using a single dual axis device or two single axis devices. If a dual axis device is used, a first set of torsional hinges is used for providing movement in one direction by pivoting the device about the first set of torsional hinges. Alternately, a first one of two single axis devices may pivoted about its torsional hinges to provide the movement in a first direction. The second set of torsional hinges of the dual axis device or the second single axis device provides movement about a second axis to control movement of the device in a direction orthogonal to the first direction of movement. As an example, if the device is a mirror, closely spaced parallel image lines on a projection display or photosensitive medium may be provided.

More specifically, this invention relates to a unique design of such devices that use support anchors rather than a support frame so as to dramatically increase yield during fabrication by packing many more devices having a selected size of reflective surface onto a wafer.

BACKGROUND

The assignee of the present invention has recently developed torsionally hinged mirrors with a single reflection surface as described in U.S. patent application Ser. No. 10/384,861 and entitled "Laser Printer Apparatus Using a Pivoting Scanning Mirror". This dual axis mirror uses a first set of torsional hinges for moving a beam along a first axis such as a pivoting or resonant beam sweep and a second set of torsional hinges that selectively moves the pivoting beam sweep in a direction orthogonal to the first axis. By dynamically controlling the orthogonal position of the moving beam, both directions of the pivoting beam may be used to generate parallel image lines. Alternately, two single axis mirrors can be arranged such that one mirror provides the back and forth beam movement and the other mirror controls the orthogonal position of the beam sweep.

As will be appreciated in the semiconductor processing art, the number of devices that can be produced on a wafer (i.e. yield) is one of the important considerations if an acceptable profit margin is to be achieved. To date, the size of the functional surface or reflective surface of a MEMS device, such as a mirror, has been significantly less than the overall size of the device. The outside support frame typically determines the overall dimension of the device and is often several times larger than the functional or reflective surface. It would be advantageous and increase yield if the overall size could be reduced while keeping the functional surface the same size.

For mirror devices manufactured according to this invention, it will also be appreciated by those skilled in the art that controlling the orthogonal (vertical) position of the oscillating or resonant scan will allow a single surface or flat oscillating mirror to be used to provide a moving light source for laser printers or a full frame of raster scans suitable for use on consumer projection displays including micro projection displays such as cell phones, Personal Digital Assistants (PDA's), notebook computers and heads-up displays. Of course, if such displays are to be commercially acceptable, they must be small, low cost, robust enough to withstand greater than 1000 G's of shock, and stable over the operating temperature normally experienced by hand-held products.

Consequently, it will be appreciated that a high frequency scanning mirror is a key component to the success of such optical products manufactured according to this invention. Further, since many of the applications for such projection displays are battery powered, all of the components (including the scanning mirror) must be energy efficient.

As mentioned above, Texas Instruments presently manufactures a two axis analog mirror MEMS device fabricated out of a single piece of material (such as silicon, for example) typically having a thickness of about 100–115 microns using semiconductor manufacturing processes. The layout consists of a mirror having dimensions on the order of a few millimeters supported on a gimbals frame by two silicon torsional hinges. The gimbals frame is supported by another set of torsional hinges, which extend from the gimbals frame to a support frame or alternately the hinges may extend from the gimbals frame to a pair of hinge anchors. This Texas Instruments manufactured mirror with two orthogonal axes is particularly suitable for use with laser printers and/or projection displays. The reflective surface of the mirror may have any suitable perimeter shape such as oval, rectangular, square or other. It should also be appreciated that devices having functional surfaces other than mirror or reflective surfaces may be manufactured according to the teachings of this invention.

A similar single axis device may be fabricated by eliminating the gimbals frame altogether and extending the single pair of torsional hinges of the device directly to the support frame or support anchors. Two single axis devices rather than one dual axis device may then be used to generate bi-directional movement, but may require more space.

One presently used technique to oscillate a device about a first axis is to provide an electromagnetic coil on each side of the mirror and then drive the coils with an alternating signal at the desired sweep frequency to alternately magnetically attract portions of the device on opposite sides of the pivot axis. Electromagnetic coils may also be used to provide the orthogonal movement so as to achieve bi-directional movement. In addition, the device can be made to pivotally resonate about its axis in response to electromagnetic excitation. Such resonant motion is particularly advantageous when the bi-directional device is a mirror used in printers or various display devices. However, other techniques of generating vibrations in the mirror structure to cause the device to pivotally resonate about its axis may be used. These other techniques may include electrostatic drives, piezoelectric drives and the like.

SUMMARY OF THE INVENTION

The issues mentioned above are addressed by the present invention which, according to one embodiment, provides a device, such as for example, a mirror apparatus suitable for use as the means of generating a sweeping or scanning beam of light across the width of a target medium such as the projection screen of a display device or a photosensitive medium of a copier. Accordingly, a first embodiment comprises a device for providing pivotal movement about an axis and comprises first and second members or anchors for supporting the device and for defining a pivotal axis extending therebetween. A functional surface portion is located between the first and second members and when the device is a mirror, the functional surface is a reflective surface positioned to intercept a beam of light from a light source. A first pair of torsional hinges are attached to said reflective surface portion for pivoting the reflective surface portion, and a driver circuit pivotally oscillates the reflective surface portion about the first pair of torsional hinges to provide a beam movement, such as for example, an oscillating beam sweep.

According to another embodiment, a first pair of torsional hinges extend from the functional surface portion to a gimbals portion supported by a second pair of torsional hinges which are located at substantially a right angle with said first pair of hinges. The second pair of torsional hinges extend from the gimbals portion to the first and second members supporting the device so that the gimbals portion can pivot about a second axis which is orthogonal to the first axis. For some applications, it may be advantageous if the mirror device has a resonate frequency. For example, a mirror device having a resonant frequency at which the reflective surface portion oscillates about a first pair of torsional hinges may be advantageously used in printers and display devices.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 13, 14 and 15 illustrate the use of a two-axis resonant mirror such as shown in FIGS. 10 and 11 to generate a bi-directional beam sweep across a display screen or a moving photosensitive medium according to teachings of the present invention;

FIG. 19 illustrates the electromagnetic drive circuitry for orthogonal movement of the device for both the electrostatic resonant pivoting embodiment and the piezoelectric resonant pivoting embodiment;

FIGS. 20A and 20B illustrate the layout on a silicon wafer of dual axis mirrors having a support frame;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention and do not limit the scope of the invention.

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to devices having a functional surface, such as for example only, a mirror or reflective surface supported by a pair of torsional hinges extending from the functional surface to a pair of support members or anchors. One embodiment of the invention discussed in detail hereinafter relates to projection display devices and laser printers using mirror apparatus with a moveable reflecting surface that has torsional hinges and is particularly suitable for use to provide the repetitive scans of a raster scan display device by using either a single two-axis resonant mirror according to one embodiment, or using one single axis resonant mirror in combination with a second single axis mirror for providing spaced and parallel scan lines by continuously adjusting the "vertical" movement of the beam with respect to the raster scan movement.

Figure 1A:
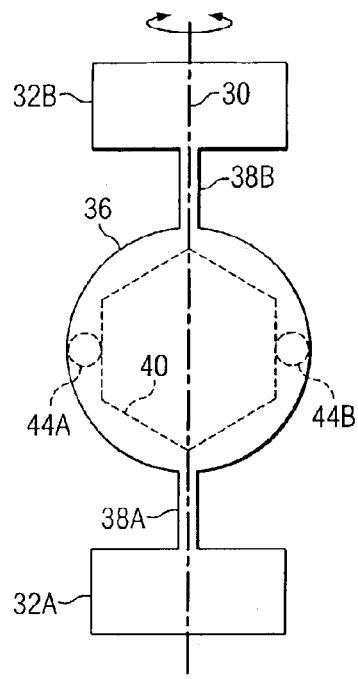
FIGS. 1A, 1B and 1C are top views of different embodiments of a single axis torsional hinge device, such as a mirror, supported by a hinge anchor.
Figure 1B:
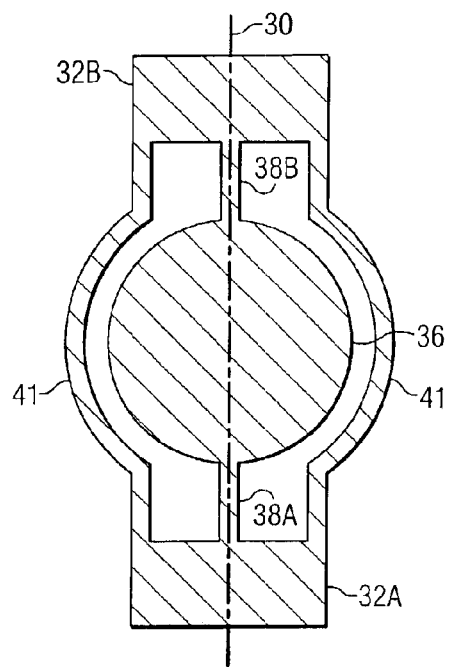
Figure 1C:
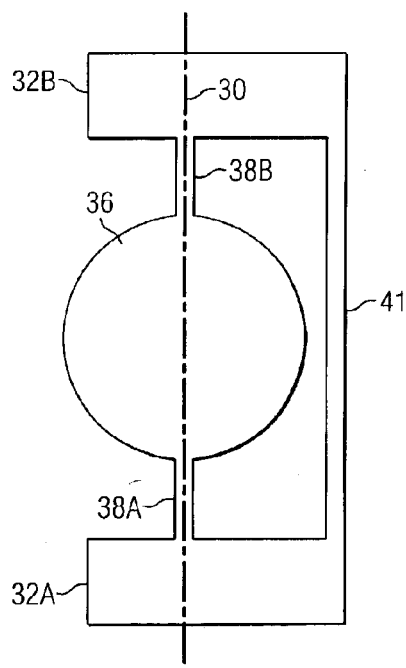
Figure 1D:
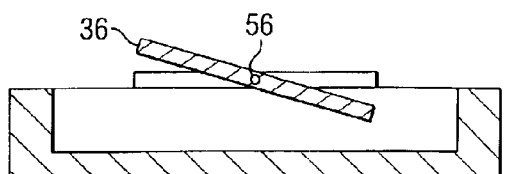
FIG. 1D is a simplified cross-sectional view taken along line DD of FIG. 1A.
Figure 2:
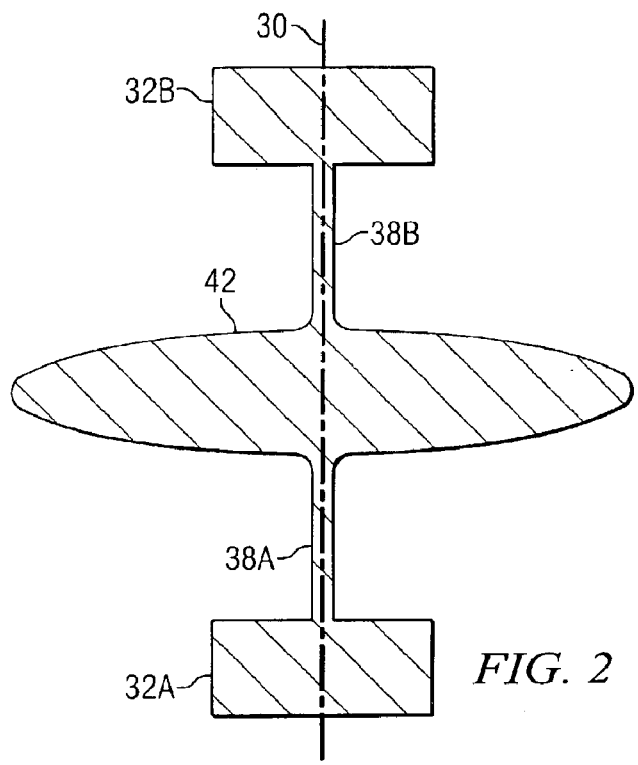
FIG. 2 is another embodiment of an actual single axis flat oval shaped mirror incorporating features of the present invention.

Referring now to FIGS. 1A, 1B and 1C, there are shown top views of devices having a single pair of torsional hinges for pivoting around a first axis 30. As shown, the device of FIG. 1A includes a pair of support members or anchors 32A and 32B suitable, at least one of which is used for mounting or bonding to a support structure 34 as shown in FIG. 1A. FIG. 1D is a simplified cross-sectional view taken along line AA of FIG. 1A. A functional surface portion 36 such as a reflective surface or mirror is attached to support anchors 32A and 32B by a pair of torsional hinges 38A and 38B. FIGS. 1A, 1B and 1C also illustrate that the functional surface portion 36 may have any suitable shape or perimeter such as the hexagon shape indicated by dotted line 40. Other suitable shapes may include oval, square or octagonal. For example, FIG. 2 illustrates an actual mirror device manufactured according to this invention found to be suitable for use in providing a resonant beam sweep. As can be seen, the mirror portion 42 is a very flat oval shape having a long dimension of about 5.5 millimeters and a short dimension of about 1.2 millimeters. FIGS. 1B and 1C illustrate the use of a reinforcing member(s) 41 extending between anchors 32A and 32B to prevent unacceptable twisting or bending of the hinges and anchors with respect to the functional surface portion during handling. Reinforcing member(s) 41 is not suitable for mounting the device to a support structure.

As will be discussed in more detail hereinafter, the functional surface portion 36 may be made to pivot or oscillate about axis 30 in response to various types of drive circuits. For example, a mirror device manufactured according to this invention may be driven to resonance for providing a repetitive beam sweep by electrostatic or piezoelectric drive circuits, or may be controlled much more directly to provide a slower orthogonal or vertical control to index each beam sweep to maintain spacing between successive lines on a projection display while at the same time maintaining all of the beam sweeps parallel to each other. Electromagnetic drive circuitry is particularly suitable for the vertical or orthogonal drive of mirror devices. When the orthogonal or vertical movement of the device is driven or controlled by an electromagnetic circuit, the functional surface portion 36 may include small magnets on the functional surface as indicated by dashed line areas 44A and 44B. The placement and use of the small magnets will be discussed in more detail with respect to FIGS. 12A through 12D.

Figure 3:
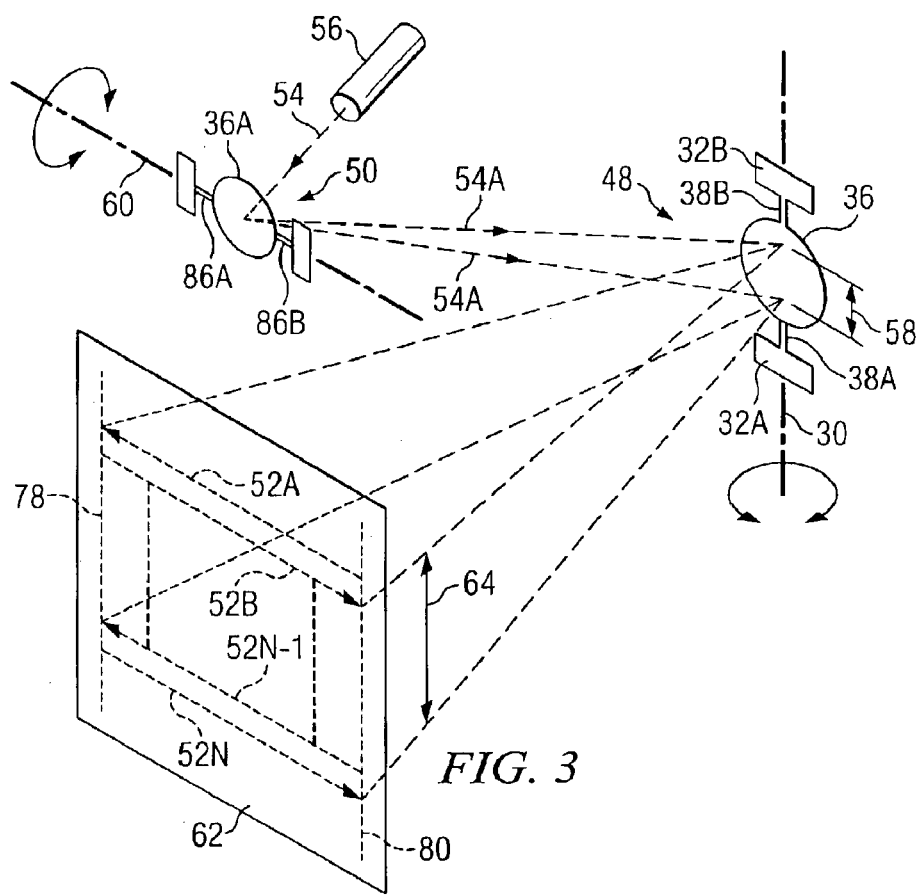
FIG. 3 is a perspective illustration of the use of two synchronized single axis mirrors such as shown in FIGS. 1A and 1D to generate beam movement across a display screen or a moving photosensitive medium according to the teachings of an embodiment of the present invention.

Referring to FIG. 3 there is a perspective illustration of an embodiment of the present invention wherein the devices manufactured according to this invention are two mirrors, each of which pivot about a single axis, such as the single axis mirrors of the type shown in FIGS. 1A, 1B and 1C and 2 to achieve motion of the light beam in two dimensions. In addition, although FIGS. 1A, 1B and 1C and 2 illustrate a single axis device, two dual axis devices of the type shown in FIGS. 10 and 11, and discussed hereinafter, can be used to obtain the same results as achieved by using two single axis devices. For example, two of the two-axis device arrangements shown in FIGS. 10 and 11 may be used by not providing (or not activating) the drive mechanism for one of the axes. However, if two devices are to be used, it is believed to be advantageous to use two of the more rugged single axis devices such as shown in FIGS. 1A, 1B and 1C and 2 as discussed above.

Therefore, according to one specific embodiment of the invention, FIG. 3 illustrates a first single axis torsional hinged mirror used in combination with a second similar single axis torsional mirror to provide a resonant scanning mirror such as may be used with a projection display or laser printer. As shown in this embodiment, there is a first mirror apparatus 48 of the type discussed above with respect to FIGS. 1A, 1B and 1C and 2 that includes a pair of support members or anchors 32A and 32B supporting a mirror or reflective surface 36 by the single pair of torsional hinges 38A and 38B. Thus, it will be appreciated that if the mirror portion 36 can be pivoted back and forth by a drive source, the mirror can be used to cause an oscillating light beam across a photosensitive medium. As will be discussed hereinafter, a particular advantageous method of pivoting the mirror back and forth is to generate resonant oscillation of the functional surface (mirror) about the torsional hinges 38A and 38B. However, as will also be appreciated, there also needs to be a method of moving the light beam in a direction orthogonal to the oscillation if line images are to be maintained parallel. Therefore, as will be discussed with respect to FIG. 3, a second single axis mirror apparatus 50, such as illustrated in FIGS. 1A and 2, may also used to provide the vertical movement of the light beam.

As discussed above, the optical system of the embodiment of FIG. 3 uses a first single axis mirror apparatus 48 to provide the right to left, left to right pivoting of the light beam as represented by dotted lines 52A, 52B, 52N-1 and 52N. However, the up and down control of the beam trajectory is achieved by locating the second single axis mirror apparatus 50 such that the reflective surface or mirror portion 36A intercepts the light beam 54 emitted from light source 56 and then reflects the intercepted light to the mirror apparatus 48 which is providing the back and forth pivoting such as a resonant sweep motion. Line 58 shown on mirror surface 36 of resonant mirror 48 illustrates how mirror 36A rotates around axis 60 to move the light beam 54A up and down on reflective surface 36 of mirror apparatus 48 during the left to right and right to left beam sweep so as to provide parallel lines 52A, 52B through 52N-1 and 52N on a projection display screen or a moving medium 62. Double headed arrow 64 illustrates the vertical or orthogonal movement of the beam sweep projected from mirror surface 36 of mirror apparatus 48.

Figure 3A:
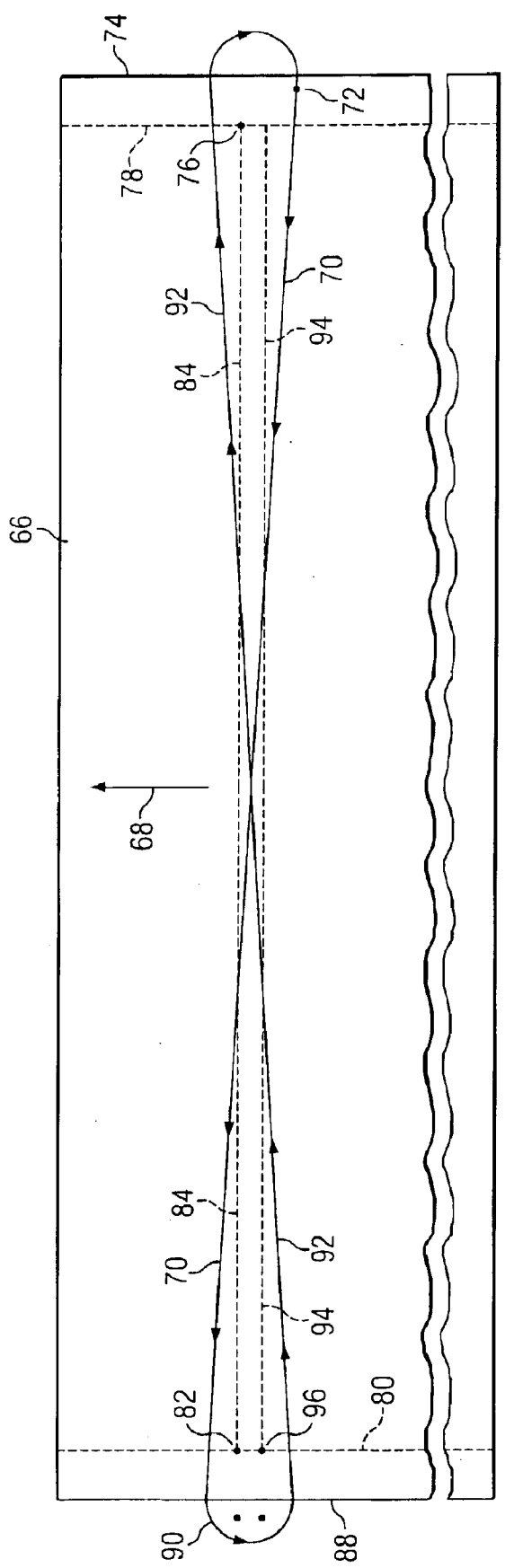
FIG. 3A illustrates one complete resonant beam sweep projected onto a moving photosensitive medium of a laser copier.
Figure 3B:
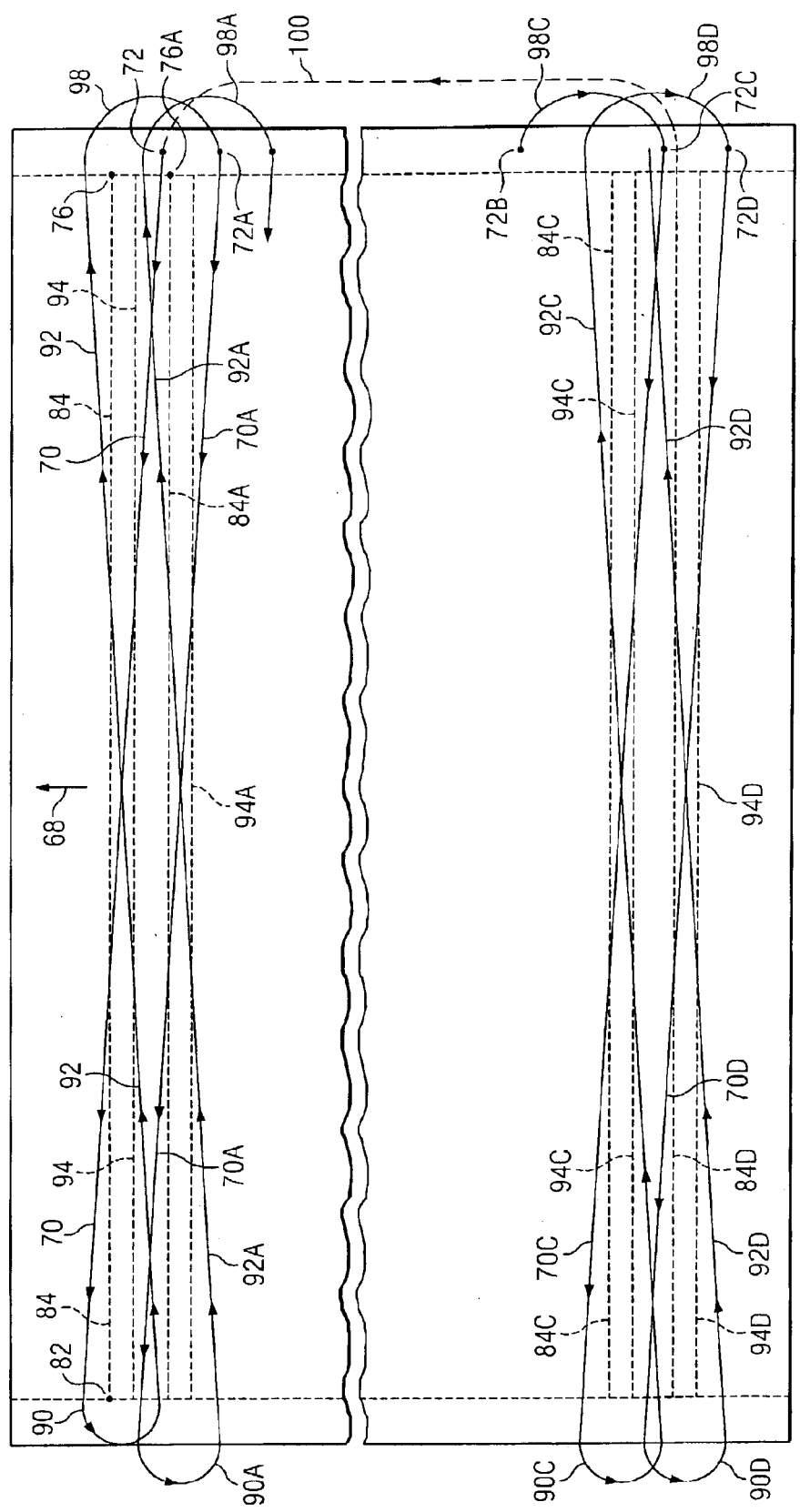
FIG. 3B illustrates a beam sweep path of a frame of image lines projected onto a display screen.

Referring now to FIGS. 3A and 3B, there is shown an exaggerated schematic of the light beam trajectory responsive to movement about two axes during a complete back and forth pivoting cycle of mirror apparatus 48. As discussed above, the movement about two axes may be provided by two single axis mirrors manufactured according to the teachings of this invention as illustrated in FIG. 3 or a single dual axis mirror to be discussed later. The beam trajectory illustrated in FIG. 3A is shown with a photosensitive medium 66 moving as indicated by arrow 68 to illustrate how the beam trajectory generates parallel image lines for a bi-directional laser copier during successive scan lines of a single back and forth pivoting cycle. In the example shown in FIG. 3A, a right to left movement portion of the beam trajectory is identified by the reference number 70. It should be understood that the term "beam trajectory" as used herein does not necessarily mean that the laser light is on or actually providing light. The term is used herein to illustrate the path that would be traced if the light was actually on at all times. As will be appreciated by those skilled in the art, the light source is typically turned on and off continuously due to modulation and is also typically switched off at the two ends (left and right) of a scan or sweep. However, the modulation pattern can vary from being on for the complete scan or sweep to being off for the complete scan. Modulation of the scanning beam, and switching off at the end portion of a scan is also, of course, true for all types of laser printers including laser printers which use a rotating polygon mirror. Therefore, in the embodiment shown in FIG. 3A, the laser beam is capable of providing modulated light at about point 72 which is next to edge 74 of medium 66. However, as will be recognized, a printed page usually includes left and right margins. Therefore, although a printed image line could begin at point 72 on a right to left scan of the beam trajectory as shown by trajectory portion 70, the modulated light beam does not actually start to produce an image until point 76 at margin 78 of the right to left portion of the trajectory and stops printing at the left margin 80. This is also indicated at the rightmost dot 82 on the printed image line 84. It is important to again point out that for a laser printer application the photosensitive medium 66 is moving in a direction as indicated by arrow 68. Therefore, to generate the top printed image line 84 between margins 78 and 80 as a horizontal line, the right to left beam trajectory is orthogonally controlled by mirror assembly 50 pivoting on torsional hinges 86A and 86B about axis 60 an appropriate amount so that the resulting line between the beginning right end point 72 and the left ending point 82 is horizontal. That is, the beam trajectory is moved up during a beam sweep by substantially the same amount or distance as the constantly moving photosensitive medium 66 moves up during the right to left beam sweep. After the right to left portion of the beam trajectory is complete at the left edge 88 of medium 66 (i.e., half of the resonant cycle), the mirror is pivoted about torsional hinges 86A and 86B in the opposite direction as the resonant mirror 36 changes the direction of its sweep as indicated by portion 90 of the beam trajectory. Then, when the left to right portion 92 of the trajectory beam sweep (resulting from pivoting about axis 30 on torsional hinges 38A and 38B or mirror apparatus 48) again reaches the left edge 80 of medium 66, the mirror is again pivoted about torsional hinges 86A and 86B to move the left to right portion 92 of the beam trajectory upward as it traverses medium 66 in a manner similar to the right to left portion of the trajectory. Thus, the line of image 94 starting at beginning point 96 and generated during the left to right scan is maintained parallel to the previous generated image line 84.

Then as the beam trajectory passes the right edge 74 of the medium 66, the resonant scan mirror apparatus 48 again begins to reverse its direction by pivoting in the opposite direction about torsional hinges 38A and 38B so as to return to the starting point 72. The cycle is then of course repeated for another complete resonant sweep such that two more image lines are produced. Although the embodiment discussed above described a bi-directional printer, it will be appreciated by those skilled in the art that the torsional hinge devices with anchors of this invention can readily be adapted for a single direction scan.

FIG. 3B illustrates a similar beam pattern projected onto a display screen having a larger orthogonal dimension rather than onto the moving medium of a laser printer. As shown in FIG. 3B, the movement of the beam is the same as discussed with respect to FIG. 3A with respect to portions 70 through 92 of the beam sweep. However, after the beam trajectory passes the right edge 78 of the display screen 66A and begins to reverse its direction by pivoting in the opposite direction about hinges 38A and 38B, instead of returning to point 72 an orthogonal incremental increase is added to index the trajectory, as indicated at 98, the equivalent of one scan line so that the beginning point is now at 72A rather than 72. The resonant cycle then continues as before, except it is orthogonally incremented at the end of every cycle to a new starting point as indicated at points 72B, 72C, etc. Once the trajectory has been incremented an amount equal to the full vertical display (i.e., completed a full display frame), the starting point is again repositioned at 72 as indicated by return line 100 and the full raster scan of a new frame begins. Similarly to the printer embodiment discussed above, the device of this invention can be readily adapted to generate a single direction scan line.

Figure 4A:
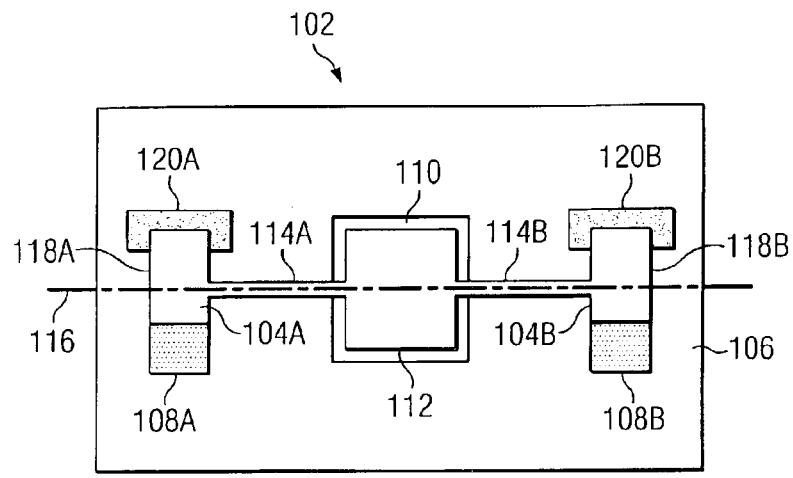
FIGS. 4A and 4B illustrate an arrangement for using inertially coupling electrostatic drive circuitry to generate the resonant pivoting about the torsional axis of a single axis device.
Figure 4B:
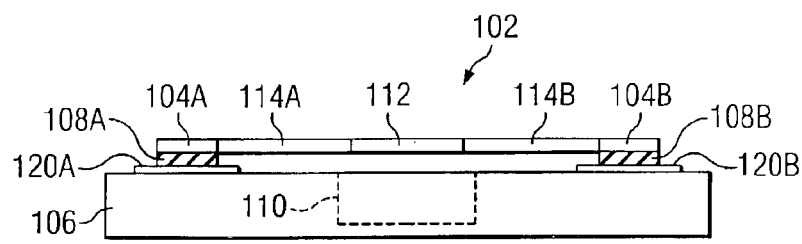

Referring now to FIGS. 4A and 4B, there is shown a top view and side view, respectively, of circuitry for driving a single axis torsional hinge device, such as functional surface 36 of FIG. 1A or 2, into resonance. As shown, according to these embodiments, the device 102 includes a pair of support members or anchors 104A and 104B at least one of which is mounted or bonded to a support structure 106 by an adhesive or epoxy by means of stand-offs 108A and 108B. Also as shown in the side view of FIG. 4B, support structure 106 defines a cavity 110. The functional surface portion 112 is attached to the two support anchors 104A and 104B by a pair of torsional hinges 114A and 114B such that the functional surface portion 112 is located above the cavity 110. As is clearly shown, the perimeter of cavity 110 is larger than the perimeter of functional surface portion 112 such that the functional surface portion 112 can freely rotate around torsional hinges 114A and 114B without hitting the bottom of cavity 110.

As mentioned above, electromagnetic drives have been successfully used by alternately magnetically attracting one side and then the other to rotate torsional hinged supported device 112 about the axis 116 through hinges 114A and 114B. Such electromagnetic drives may also be used to set up resonance oscillation of the device 112 about its axis in a manner as will be discussed below, but are more useful for controlling the position of a second device such as mirror 36A of FIG. 3 for orthogonally positioning the back and forth pivoting beam sweep in response to varying signals provided by circuitry to be discussed later. Furthermore, such electromagnetic drives require the mounting of electromagnetic coils below the device thereby adding cost and taking up space.

According to one embodiment of the present invention, device 112 is caused to resonant about the axis 116 by electrostatic forces. Therefore, referring again to the embodiment of FIGS. 4A and 4B, there is included at least one electrostatic drive plate located below an end portion 118A or 118B. According to one embodiment, a pair of drive plates 120A and 120B are located below opposite end portions 118A and 118B of support anchors 104A and 104B. Also as shown in the side view of FIG. 4B of this embodiment, stand-off mounting members 108A and 108B are selected such that a gap 122 (shown in FIG. 5) exists between the bottom surface of opposite end portions 118A and 118B and the top surface of electrostatic drive plates 120A and 120B. It has been determined that selecting the thickness of the stand-off mounting 108A and 108B such that gaps 122 are between about 0.2 μm and 0.05 μm is particularly effective. An alternating voltage is then connected between at least one of the functional surface support anchors 104A or 104B and the electrostatic plates 120A and 120B.

As an example, and assuming the device is designed to have a resonant frequency about its torsional hinges that is between about 1 KHz and 50 KHz, if an alternating voltage also having a frequency of between these two values is connected across the electrostatic plates and at least one of the anchors 104A or 104B, the functional surface will begin to oscillate at substantially the frequency of the applied voltage. The actual resonant frequency of a functional surface pivoting about its torsional hinges can be determined by maintaining the voltage level constant and varying the frequency of the applied voltage between the two voltage limits. A frequency in which the device rotation is maximum, will be the resonant frequency. The oscillations of the functional surface results from the vibrational forces generated by the "on/off" electrostatic forces between one (or both) of the device anchors 104A and 104B and the electrostatic plates 120A and 120B being inertially coupled to the functional surface 112 appropriate through the torsional hinges 114A and 114B. The resonant frequency of the functional surface varies not only according to the size of the functional surface itself, but also according to the length, width and thickness of the two torsional hinges 114A and 114B. It should be noted that in the embodiment of FIG. 4A, the torsional hinges 114A and 114B are not attached to the midpoint of sides of functional surface portion 112. That is, the axis 116 lying through the torsional hinges 114A and 114B does not divide the functional surface portion 112 into two equal parts. As shown, the "bottom" portion of the illustration of surface 112 is larger than the "top" portion. It will be appreciated, of course, that use of the terms "bottom" portion and "top" portion is for convenience in describing the device and has nothing to do with the actual positioning of the device. Although attaching the hinges "off center" may help initiate resonance in the structure by creating an imbalance, it has been determined that resonance of the surface may be achieved almost as quickly if the mirror is not off center. Furthermore, stresses may well be reduced and the required energy to maintain resonance may be somewhat less with a balanced arrangement.

Figure 5:
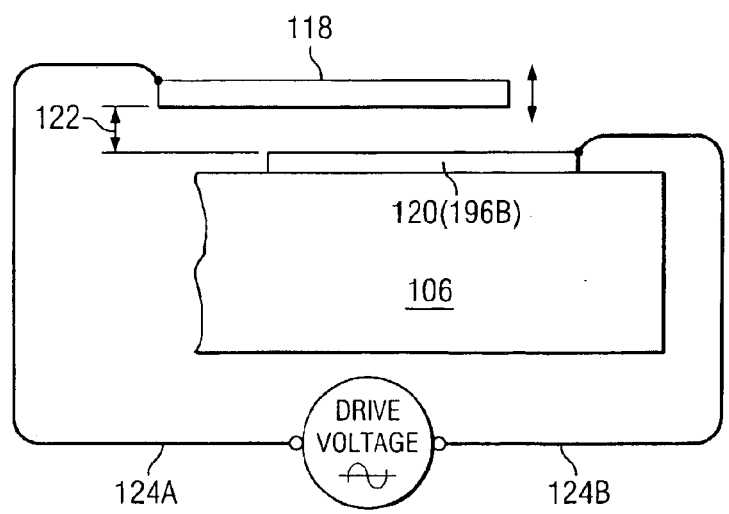
FIG. 5 illustrates the electrical connection between the electrostatic plates and the mirror assembly of FIGS. 4A and 4B.

FIG. 5 is applicable to FIGS. 4A and 4B, and illustrates the electrical connections 124A and 124B for applying an alternating voltage between the device structure and the electrostatic plates.

Figure 6A:
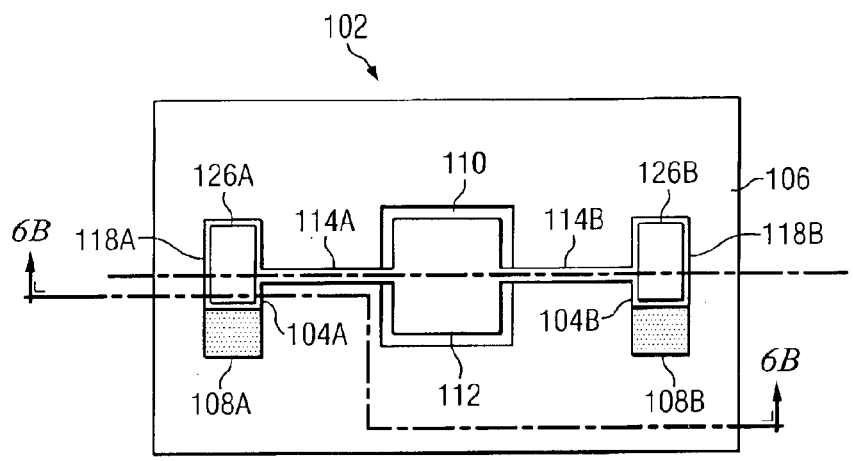
FIGS. 6A and 6B illustrate an arrangement for using a piezoelectric drive circuit to generate the inertially coupled resonant pivoting about the first or resonant axis of a device.
Figure 6B:
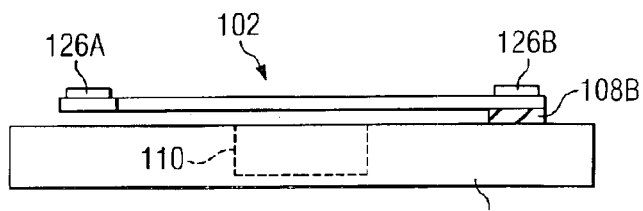

FIGS. 6A and 6B illustrate resonant device arrangements mounted to the support anchors 104A and 104B in the same manner as discussed above with respect to FIGS. 4A and 4B. However, rather than using an electrostatic plate and electrostatic forces to generate resonant motion of the functional surface around its torsional axis, this embodiment employs slices of piezoelectric material 126A and 126B bonded to one or both of the support members or anchors 104A and 104B. The piezoelectric material 126A and 126B is sliced such that it bends or curves when a voltage is applied across the length of the strip or slice of material. As will be understood by those skilled in the art, the response time for piezoelectric material will be very fast such that an alternating voltage will cause a strip of the material to bend and curve at the same frequency as the applied voltage. Therefore, since the material is bonded (top or bottom surface) to at least one of the device anchors, 104 or 104B, the application of an alternating voltage having a frequency substantially equal to the resonance frequency of the device will cause the vibration motion to be inertially coupled to the functional surface portion 112 and to thereby initiate and maintain the resonant oscillation as discussed above.

Figure 7:
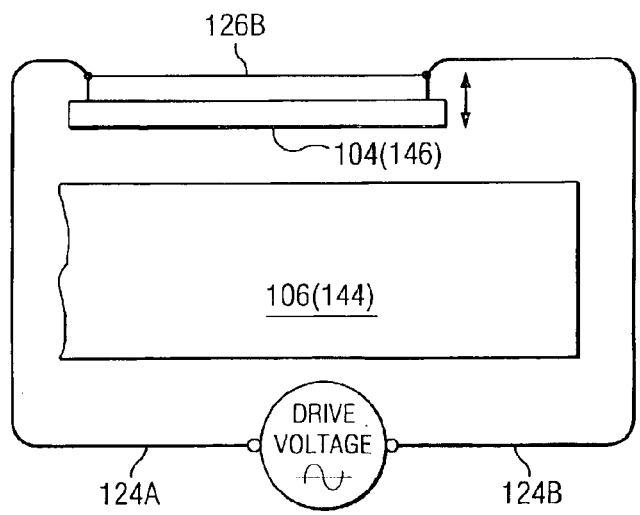
FIG. 7 illustrates the electrical connection between the piezoelectric drive material and the device of FIGS. 6A and 6B.

FIG. 7 illustrates the electrical connections for providing an alternating voltage to the mirror structure and the two ends of piezoelectric materials 126A and 126B.

Therefore, it will be appreciated that the single axis device structure discussed above with respect to FIGS. 4A and 4B, and FIGS. 6A and 6B may be used as the mirror structure 48 of FIG. 3 to provide the resonant sweep of the two single axis mirror arrangements discussed heretofore with respect to FIG. 3. Movement of the second mirror 50 in the arrangement of FIG. 3 may be directly controlled to provide the necessary orthogonal movement by electromagnetic coils as also discussed above.

As will be appreciated by those skilled in the semiconductor processing art, the number of operational devices that can be produced on a single wafer (i.e., yield) is a major factor in reducing costs of manufacturing. Therefore, if the number of operational devices per wafer can be significantly increased, the costs can be reduced.

Figure 8A:
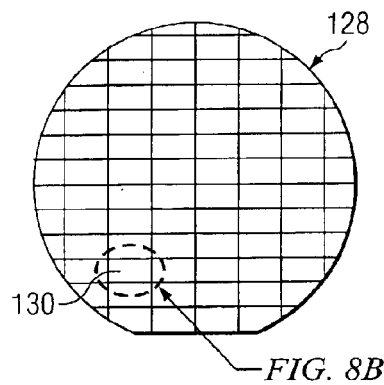
FIGS. 8A and 8B illustrate the layout on a silicon wafer of single axis devices, such as mirrors, having a support frame.
Figure 8B:
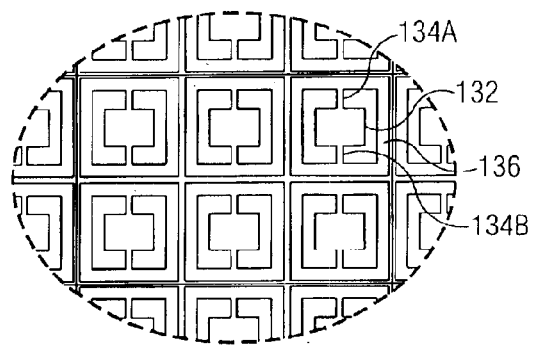

Referring now to FIG. 8A, there is shown a wafer 128, such as a silicon wafer typically used in the manufacture of semiconductive products, which has been patterned with a multiplicity of MEMS devices having a functional surface supported by a pair of torsional hinges including the six devices illustrated in the area 130 which has been expanded in FIG. 8B. As shown, each of the six devices has a functional surface 132, such as for example only, a mirror supported by a pair of torsional hinges 134A and 134B which are attached to a support frame. It will be understood of course that each of the other areas on wafer 128 will also have six devices. Thus, the wafer of FIG. 8A would produce six times the number of areas such as area 130. Therefore, it is assumed the wafer 128 can produce approximately 360 single axis devices of the type shown in FIG. 8B.

Figure 9A:
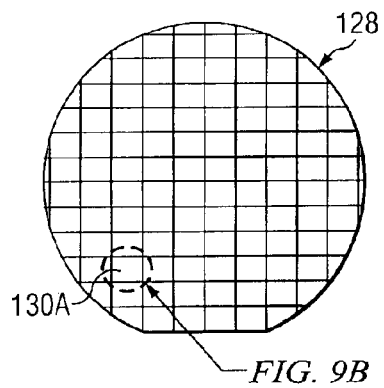
FIGS. 9A and 9B illustrate the layout on a silicon wafer of single axis devices, such as mirrors, having support anchors according to the teachings of the present invention.
Figure 9B:
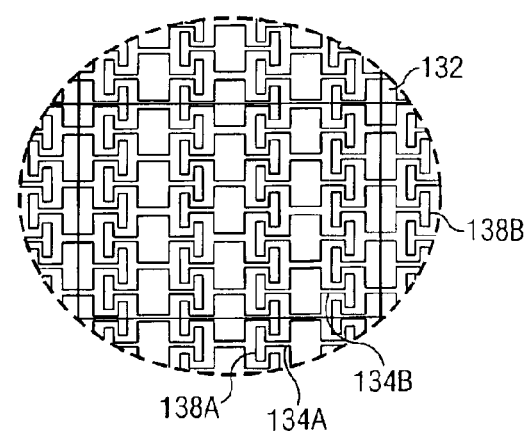

However, as shown in FIGS. 9A and 9B, at least twelve devices using support anchors 138A and 138B instead of a support frame can be produced in substantially the same area 130A. In this example, there would be 100% increase in yield. The functional surface portion 132 and the torsional hinges 134A and 134B of the mirrors of FIG. 9B is the same size as the functional surface and hinges of the devices shown in FIG. 8B. Thus, the same size wafer 128 as used in FIG. 8A that yields 360 devices with a support frame would yield on the order of 720 MEMS devices with anchors 138A and 138B.

Figure 10:
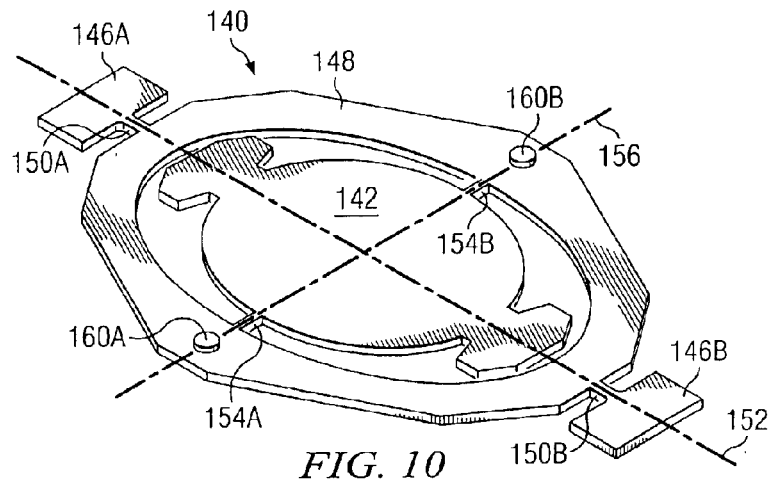
FIG. 10 is a perspective view and FIG. 11 is a top view of two embodiments of a two-axis torsional hinge mirror device supported by hinge anchors for generating a bi-directional beam sweep according to the teachings of the present invention.

Referring now to FIG. 10, there is shown a perspective view of a single two-axis bi-directional device assembly 140 providing movement about a first axis and movement about a second axis substantially orthogonal to the first axis. A mirror device of this type can be used to provide back and forth pivoting beam sweeps such as resonant scanning across a projection display screen or moving photosensitive medium as well as adjusting the beam sweep in a direction orthogonal to the back and forth pivoting of the reflective surface or mirror portion 142 to maintain spaced parallel image lines produced by the resonant raster beam sweep. As shown, device 140 is illustrated as being suitable for being mounted on a support structure. The device 140 may be formed from a single piece of substantially planar material and the functional or moving parts may be etched in the planar sheet of material (such as silicon) by techniques similar to those used in semiconductor art. As discussed below, the functional or moving components include, for example, a pair of support members or anchors 146A and 146B, an intermediate gimbals portion 148 and the inner functional surface portion 142. It will be appreciated that the intermediate gimbals portion 148 is hinged to the anchors 146A and 146B at two ends by a first pair of torsional hinges 150A and 150B spaced apart and aligned along a first axis 152.

The inner, centrally disposed functional surface portion 142 (such as a mirror or reflective surface) is attached to gimbals portion 148 at hinges 154A and 154B along a second axis 156 that is orthogonal to or rotated 90° from the first axis. When the functional surface portion 142 is a mirror, the device is on the order of about 100 microns in thickness and is suitably polished on its upper surface to provide a specular or mirror surface. In order to provide necessary flatness, the mirror is formed with a radius of curvature greater than approximately 2 meters with increasing optical path lengths requiring increasing radius of curvature. The radius of curvature can be controlled by known stress control techniques such as by polishing on both opposite faces and deposition techniques for stress controlled thin films. If desired, a coating of suitable material can be placed on the mirror portion to enhance its reflectivity for specific radiation wavelengths.

Figure 11:
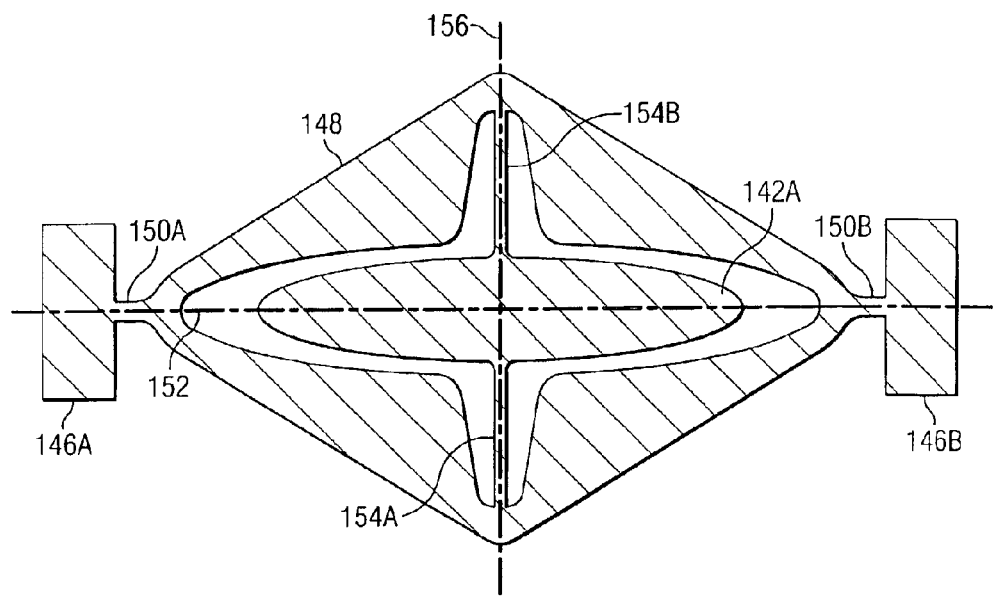

FIG. 11 is an alternate embodiment of a dual axis device manufactured according to this invention having an elongated oval mirror 142A as the functional surface. Since the remaining elements of the device shown in FIG. 11 operate or function in the same manner as equivalent elements of FIG. 10, the two figures use common reference numbers.

Figure 12A:
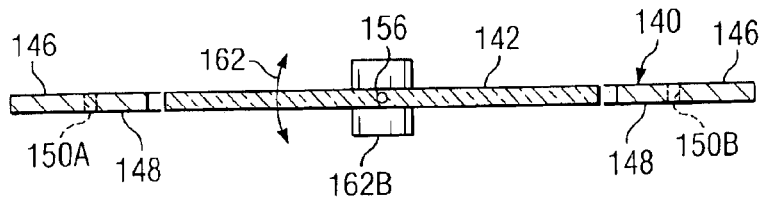
FIGS. 12A–12D are cross-sectional views of a device, such as the mirror of FIG. 10, incorporating the teachings of this invention and illustrating rotation or pivoting of the two sets of torsional hinges.
Figure 12B:
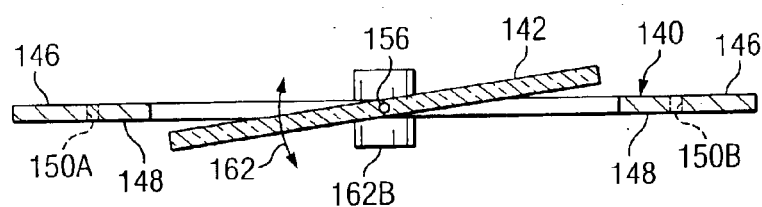
Figure 12C:
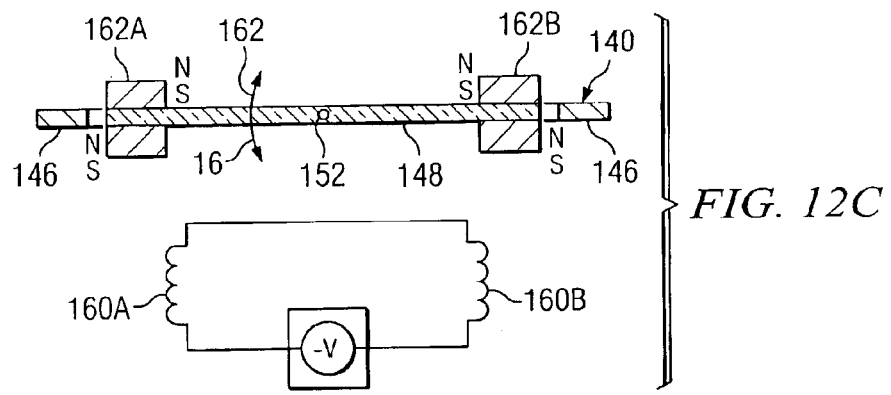
Figure 12D:
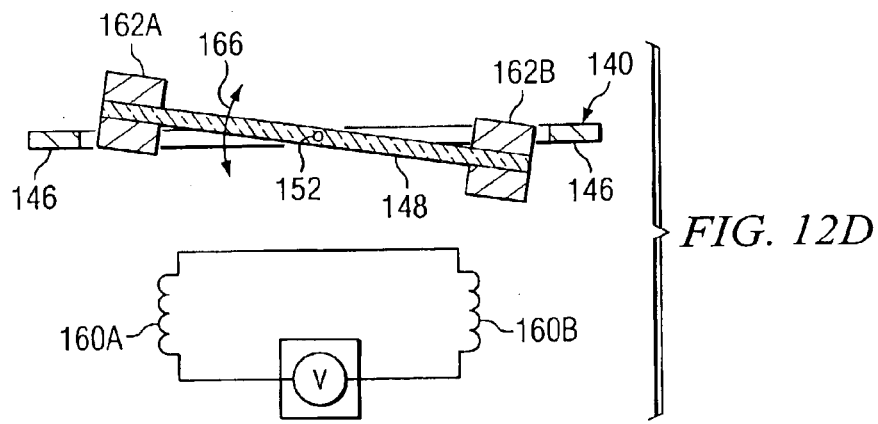

Referring to FIGS. 12A, 12B, 12C and 12D along with one of the devices illustrated in FIGS. 10 and 11, the motion of the dual axis device will be explained. Assembly 140 will be discussed with respect to inertially coupled driver circuits similar to those discussed above to generate the resonant scanning of the functional surface 142 about axis 156 illustrated in FIGS. 12A and 12B. FIGS. 12A and 12B represent a cross-section of the dual axis device of FIG. 10 taken along lines 10A—10A (on axis 152), and FIGS. 12C and 12D are cross-sections of FIG. 10 taken along lines 10B—10B (on axis 156).

Whereas the pivoting motion of the functional surface 142 may be provided by resonant drive circuits, motion of the gimbals portion 148 about axis 152 on the other hand, may be provided by another type of driver circuits such as, for example, serially connected electromagnetic coils 160A and 160B as discussed above. Coils 160A and 160B are connected to control circuitry for providing a control signal to provide a pair of electromagnetic forces for attracting and repelling the gimbals portion 148. If electromagnetic drive coils are used, the gimbals portion 148 may also include a first pair of permanent magnets 162A and 162B mounted on gimbals portion 148 along the axis 156 to enhance the operation of the electromagnetic coils. In order to symmetrically distribute mass about the two axes of rotation to thereby minimize oscillation under shock and vibration, each permanent magnet 160A and 160B preferably comprises an upper magnet set mounted on the top surface of the gimbals portion 148 using conventional attachment techniques such as indium bonding and an aligned lower magnet similarly attached to the lower surface of the gimbals portion 148 as shown in FIGS. 12A through 12D. The magnets of each set are arranged serially such as the north/south pole arrangement indicated in FIG. 12C. There are several possible arrangements of the four sets of magnets which may be used, such as all like poles up; or two sets of like poles up, two sets of like poles down; or three sets of like poles up, one set of like poles down, depending upon magnetic characteristics desired.

As will be discussed, when the functional surface is a reflective surface, pivoting about axis 152 as shown in FIGS. 12C and 12D may be used to provide the orthogonal (or vertical) motion necessary to generate a series of spaced image lines parallel to each other. Thus, by mounting a functional surface 142 such as a mirror portion onto gimbals portion 148 via hinges 154A and 154B, back and forth pivoting motion of the reflective surface portion relative to the gimbals portion occurs about axis 156 and the orthogonal motion occurs about axis 152.

The middle or neutral position of functional surface portion 142 is shown in FIG. 12A which is a section taken through the assembly along line 10A—10A (or axis 152) of FIG. 10. Rotation of functional surface portion 142 about axis 156 independent of gimbals portion 148 and/or frame portion 146 is shown in FIG. 12B as indicated by arrow 162. FIG. 12C shows the middle position of the mirror assembly 140, similar to that shown in FIG. 12A, but taken along line 10C—10C (or axis 156) of FIG. 10. Rotation of the gimbals portion 148 (which supports functional surface portion 142) about axis 152 is shown in FIG. 12D as indicated by arrow 164. The above arrangement allows independent rotation of functional surface portion 142 about the two axes and when the functional surface of the device is a mirror, the arrangement provides the ability to generate the scanning or raster movement of the light beam about axis 156 and control the orthogonal movement about axis 152.

FIGS. 13, 14 and 15 illustrate the use of a dual orthogonal scanning resonant mirror according to one embodiment (or two single axis mirrors) of the present invention for providing parallel image lines on a moving photosensitive medium such as a drum 166 rotating around axis 168. The uppermost portions of FIGS. 13, 14 and 15 are simplified top views of a dual axis mirror for providing a beam sweep on medium or rotating drum 166. The lowermost portion of the figure is a view looking at the medium 166 in a direction as indicated by arrow 170. For example, point 76 on FIG. 13 illustrates the starting point for producing an image line or rotating drum 166 and FIG. 14 illustrates the path of the beam illustrated by line 70 to produce an image line 84 which is at a right angle to the movement of drum 166. However, as shown in FIG. 15, it is not necessary to turn off the laser (light beam) on the return scan, since a return or left to right scan 92 in FIGS. 13, 14 and 15 can be continuously modulated so as to produce a printed image line 94 on the moving photosensitive medium 166. The second printed line of images 94, according to the present invention, will be parallel to the previously produced line of images 84 generated by the right to left scan 70 of the light beam. This is, of course, accomplished by slight pivoting of the mirror around the secondary axis 152 of the dual axis mirror as was discussed above.

Figure 16:
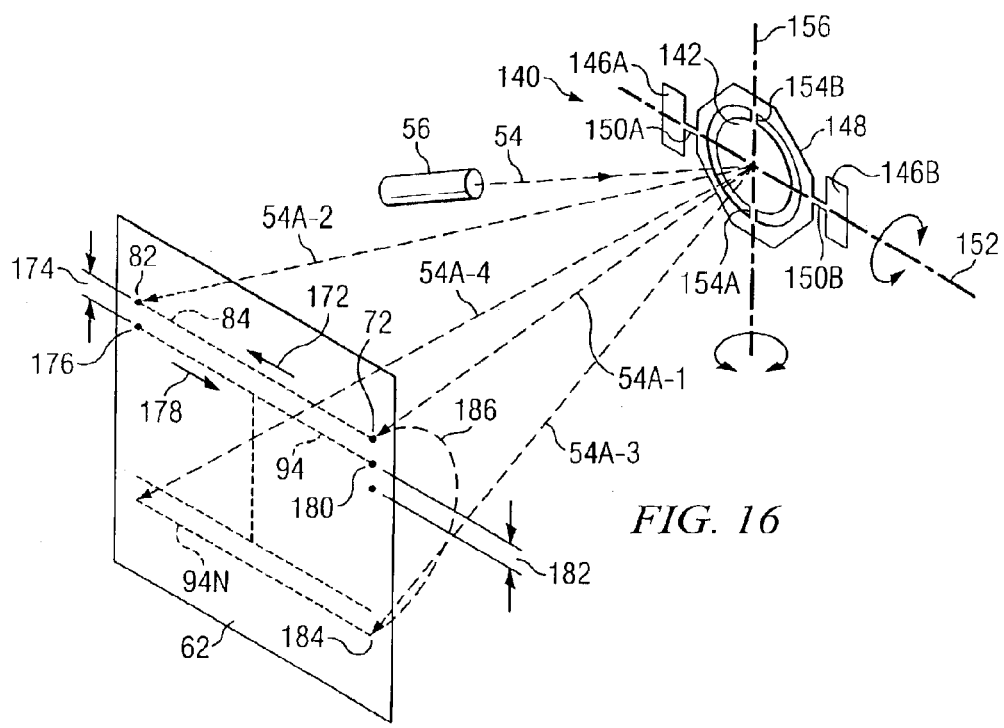
FIG. 16 is a perspective view illustrating the pattern of bi-directional beam movement and the resulting parallel beam images as may appear on a moving photosensitive medium or display screen.

The operation of the dual axis device when used as a mirror for providing pivoting beam sweep with respect to a projection display screen 164 may be better understood by referring to FIG. 16. As shown, a laser light source 56 provides a coherent beam of light 54 to the reflective surface of mirror portion 142 of dual axis mirror apparatus 140 which in turn reflects the beam of light onto a display screen 62. Reflective surface 142 is oscillating back and forth at a resonant frequency about torsional hinges 154A and 154B along axis 156 and thereby sweeps the beam across display screen 62 along image line 84 from location or point 72 to end point 82 as indicated by arrow 172 in the light beam labeled 54A-2. The oscillating mirror 142 then changes direction and at the same time the beam is moved or incremented orthogonally as indicated at path 174 to point 176 and starts the return sweep as indicated by arrow 178 to produce image line 94 between points 176 and 180. After passing point 180, the beam again begins reversing direction and is again incremented to a new start point 182 to begin another back and forth sweep. This process is repeated until the last image line 94N of a display frame ending at point 184 is produced on display screen 62. The beam is then orthogonally moved from end point 184 to start point 72 as indicated by dashed line 186 to start a new display frame. As mentioned above, mirror portion 142 is made to resonate to produce the repetitive beam sweep.

Figure 17A:
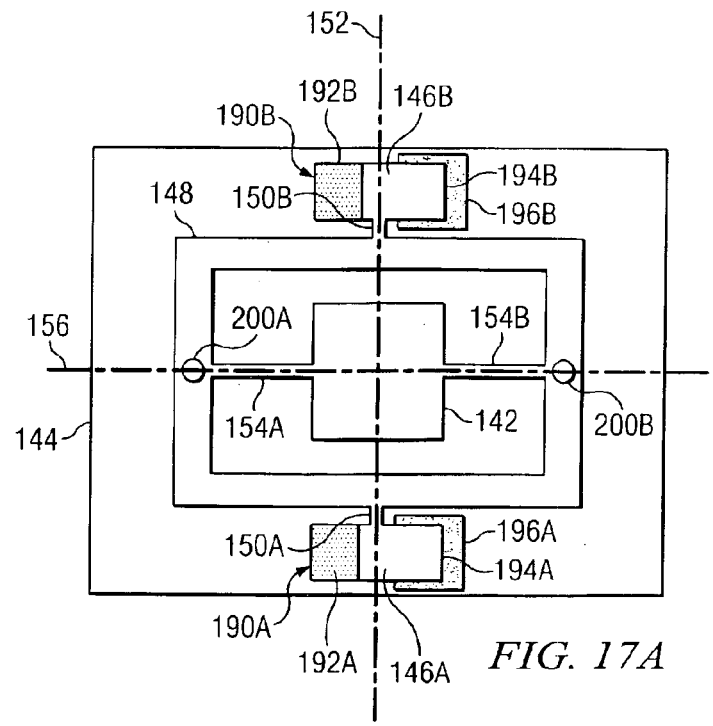
FIGS. 17A and 17B are top and side views, respectively, illustrating electrostatic drive circuitry to generate the resonant pivoting about a first pair of torsional axes and the location of the electromagnetic drive circuitry for providing orthogonal movement for a single dual axis device with a support frame.
Figure 17B:
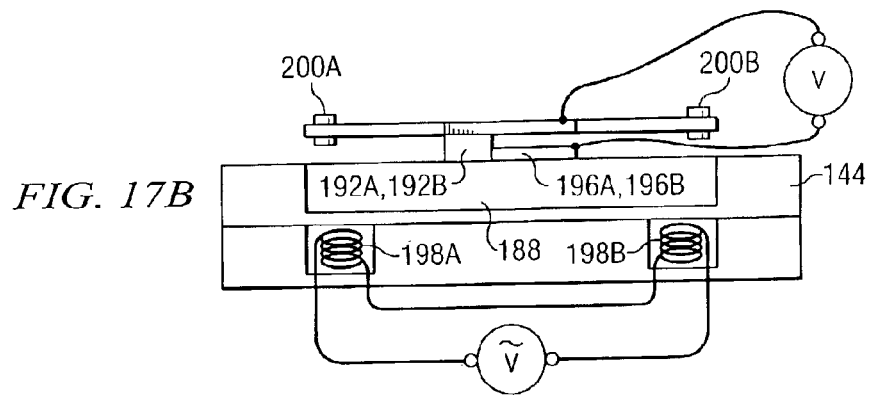

Referring now to FIGS. 17A and 17B, there is a simplified top view and side view of the device of this invention for generating both the back and forth pivoting or sweeping movement and the orthogonal movement. In a manner discussed above with respect to FIGS. 4A and 4B, support anchors 146A and 146B are mounted on a support structure 144 above a cavity 188 such that both functional surface portion 142 and gimbals portion 148 can rotate about their respective axes 156 and 152. First ends 190A and 190B of support anchors 146A and 146B are attached by mounts or spacing members 192A and 192B such that the opposite ends 194A and 194B of anchors 146A and 146B are spaced above electrostatic drive plates 196A and 196B by a small gap on the order of between 0.2 μm and 0.05 μm. An alternating drive voltage having a frequency which is approximately the resonant frequency of the functional surface portion 142 about its hinges, is then applied between the electrostatic drive plates and at least one of the device support anchors 146A and 146B to generate vibrations in the apparatus as was discussed above with respect to a single axis device and as was illustrated in FIG. 7. The energy of the vibration is inertially coupled through torsional hinges 150A and 150B to gimbals portion 148 and then through torsional hinges 154A and 154B to the functional surface portion 142. This energy vibration at approximately the resonant frequency of the device causes the reflective surface portion 142 to begin resonant oscillations about hinges 154A and 154B along axis 156 and, when used as a mirror, can be used to provide the resonant beam sweep as discussed above. The orthogonal motion is controlled by electromagnetic coils 198A and 198B as shown in FIG. 17B and FIG. 19. As discussed above, permanent magnet sets 200A and 200B may be bonded to the gimbals portion 148 to provide better stability and performance of the orthogonal drive. It should also be understood that although the energy inertially coupled to functional surface portion 142 sets the device oscillating at a full rotation and at a resonant frequency, the motion of the gimbals frame due to energy from the electrostatic plate is very slight such that the orthogonal movement can still be precisely controlled.

Figure 18A:
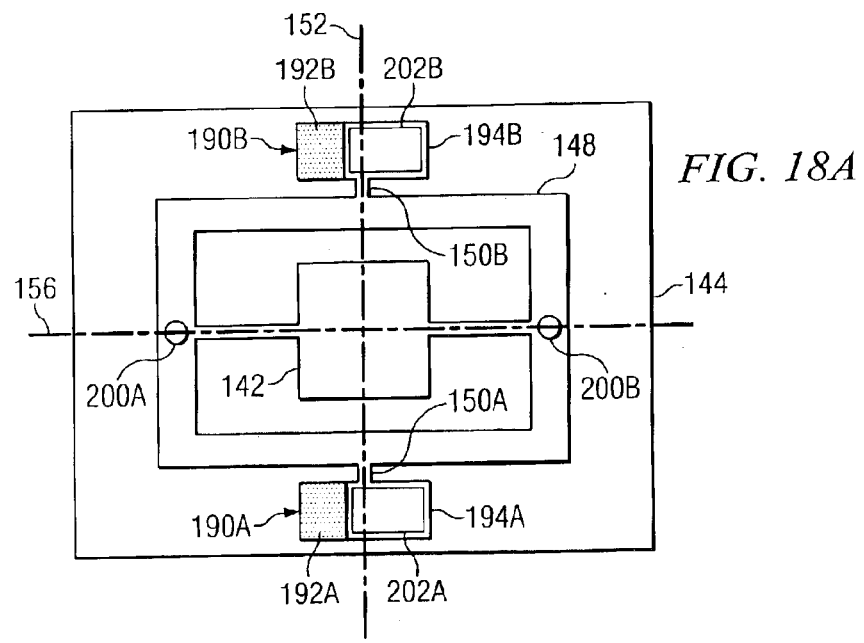
FIGS. 18A and 18B are top and side views, respectively, illustrating piezoelectric drive circuitry to generate the resonant pivoting about a first pair of torsional axes and the location of the electromagnetic drive circuitry for providing orthogonal movement for a single dual axis device using hinge anchors.
Figure 18B:
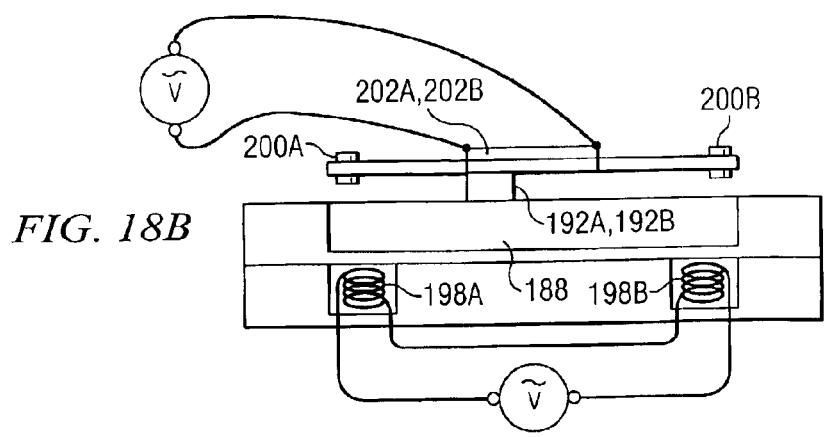

In a similar manner as discussed above with respect to single axis devices, the dual axis device can also be driven to resonance by a piezoelectric drive circuit. For example, as shown in FIGS. 18A and 18B, support anchors 146A and 146B are mounted to support structure 144 by mounts 192A and 192B as discussed above with respect to FIGS. 17A and 17B. However, instead of electrostatic plates, slices of piezoelectric material 202A and 202B are bonded to the opposite ends 194A and 194B of support anchors 146A and 146B. An alternating voltage having a frequency approximately the resonant frequency of functional surface portion 142 about torsional axis 154A and 154B is applied between both ends of the slices of piezoelectric material as discussed above with respect to FIG. 11. In the same manner as discussed with respect to FIGS. 17A and 17B, vibrating energy of the device resonant frequency is inertially coupled from the frame to the functional surface portion 142 so as to put the surface portion 142 into resonant oscillation. Consequently, when used as a mirror, the resonant oscillation can then be used to provide the resonant beam sweep for a projection display or laser copier and an electromagnetic drive circuitry can be used to provide the necessary orthogonal motion.

Figure 21A:
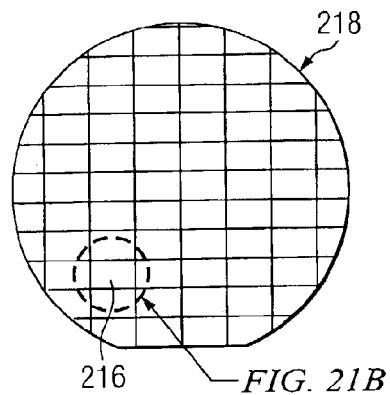
FIGS. 21A and 21B illustrate the layout on a silicon wafer of dual axis devices having support anchors according to the teachings of the present invention.
Figure 21B:
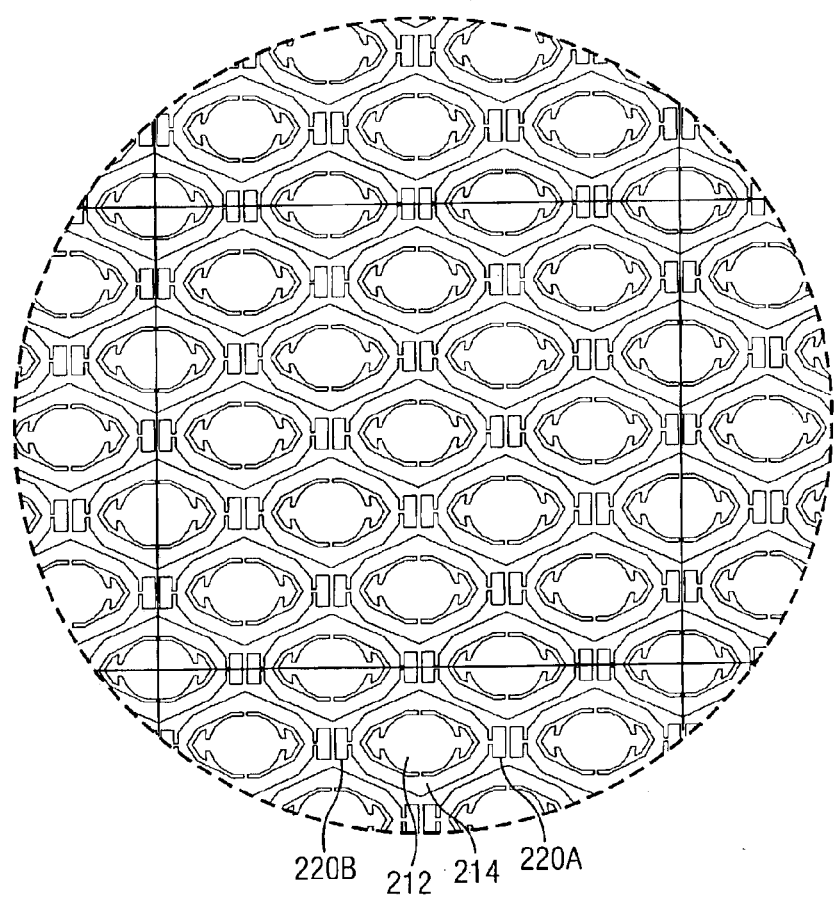

As was discussed above in FIGS. 9A and 9B with respect to the single axis device supported by a pair of anchors 138A and 138B, the yield from a wafer 128 may be significantly greater than the yield of similar devices supported by a support frame 136 as was illustrated in FIGS. 8A and 8B. Similarly, referring now to FIGS. 20A and 20B and FIGS. 21A and 21B, the yield of a dual axis device having a support frame 206 will be significantly less than a similar device which uses support anchors rather than a support frame. As shown, area 208 of wafer 210 shown in FIG. 20A is expanded as shown in FIG. 20B. The area 208 in FIG. 20B contains nine dual axis devices having a functional surface 212 mounted to gimbals portion 214 by torsional hinges. The gimbals portion 214 is also attached to the frame 206 by torsional hinges as was discussed heretofore. As shown, the array of devices in area 216 of wafer 218 has a similar functional surface 212 and gimbals portion 214, except that gimbals portion 214 is attached to support anchors 220A and 220B instead of a support frame. However, although the area 216 of FIG. 21B is substantially the same size as the area shown in FIG. 20B, there are about fifteen devices rather than nine. Thus, there is a very substantial yield increase of about 67%.

Figure 22A:
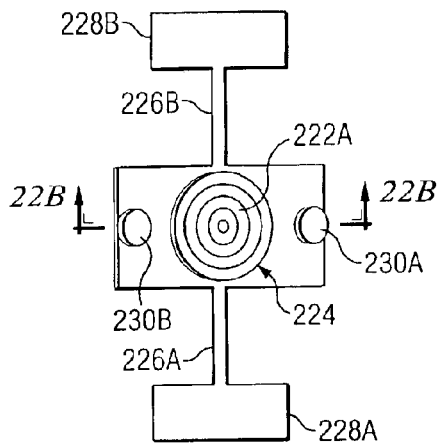
FIGS. 22A and 22B illustrate an application of the present invention wherein the functional surface portion is a fresnel lens.
Figure 22B:
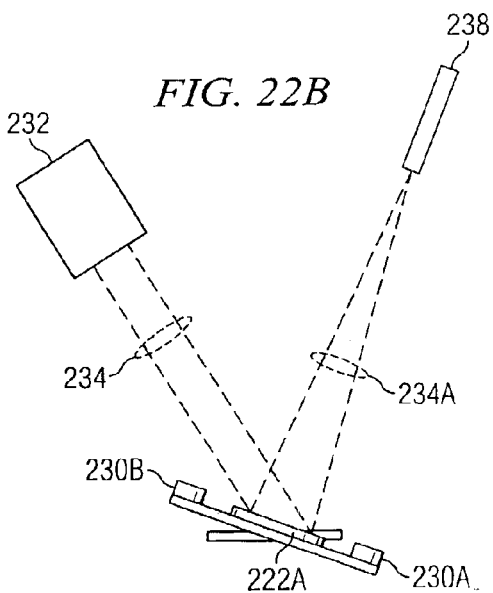

FIGS. 22A and 22B illustrate the pivotal device of the present invention wherein the functional surface portion is a fresnel lens 222A. As shown, the device comprises a functional surface portion 224 supported by a pair of torsional hinges 226A and 226B which terminate at support anchors 228A and 228B. As discussed below, the movement or pivoting of the device is required to be precise for this application and is driven by a pair of electromagnetic coils (not shown) as was discussed above. Thus, as was also discussed, the device includes small permanent magnets 230A and 230B which magnetically interact with the electromagnetic coils. A light source 232 directs a beam of light 234 onto the fresnel lens 222A where it is focused into a narrow beam 234A and received at a target 238, such as for example, an optical fiber.

Figure 23A:
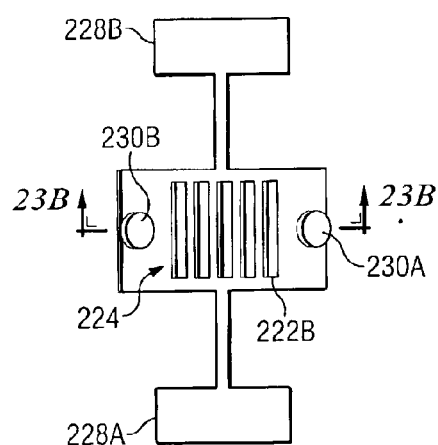
FIGS. 23A and 23B illustrate another application of the present invention wherein the functional surface portion is a light gradient for separating light frequencies and positioning of a separated light frequency onto a specific target.
Figure 23B:
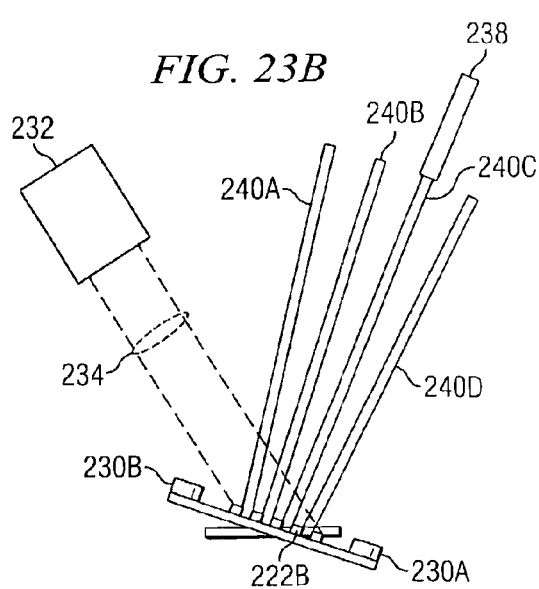

FIGS. 23A and 23B are similar to FIGS. 22A and 22B except the functional surface is a optical grating 222B, which breaks the beam of light 234 into selected ones of its frequencies as indicated at 240A, 240B, 240C and 240D and positions a selected one of the frequencies onto a specific target 238A as discussed above.

The foregoing descriptions of specific embodiments of the present invention have been presented for purposes of illustration and description. They are not intended to be exhaustive or to limit the invention to the precise forms disclosed as many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the claims appended hereto and their equivalents.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A mirror device for providing bi-directional beam movement, comprising:

a reflective surface portion positioned to intercept a beam of light from a light source, said reflective surface pivotally attached to a gimbals portion by a first pair of torsional hinges, and said gimbals portion supported by a second pair of torsional hinges extending to first and second support anchors such that pivoting of said device about said first pair of torsional hinges results in a light beam reflected from said reflective surface moving along a first path and pivoting of said device about said second pair of torsional hinges results in said reflective light moving in a direction substantially orthogonal to said first path;

a first driver for generating vibrational energy in at least one of said first and second support anchors and wherein said vibrational energy is inertially coupled through said second pair of torsional hinges to said gimbals portion and from said gimbals portion through said first pair of torsional hinges to said reflective surface portion for causing resonant pivoting in one direction about said first pair of said torsional hinges and then the opposite direction such that said reflected light beam sweeps or traces across a target area having a first dimension and a second dimension that is orthogonal to said first dimension, said reflected light beam sweeping along said first dimension of said target area as said mirror device pivots about said first pair of torsional hinges; and a second driver for pivoting said mirror device about said second pair of torsional hinges such that consecutive beam sweeps across said target are repositioned substantially orthogonal with respect to said beam sweep.

2. The mirror device of claim 1 wherein said target area is a rotating cylindrical shaped photosensitive medium.

3. The mirror device of claim 1 wherein said target area is a display screen.

4. A printer comprising:

a light source providing a beam of light;

a first mirror device comprising a first reflective surface portion positioned to intercept said beam of light, a first pair of torsional hinges attached to said reflective surface portion and extending to first and second support anchors for resonant pivoting about a first axis such that light reflected from said first reflective surface sweeps along a first path, said first and second support anchors defining a pivotal axis extending through said reflective surface portion for supporting said mirror device;

a first drive circuit for generating vibrational energy in at least one of said first and second support anchors, said vibrational energy inertially coupled through said first pair of torsional hinges to said reflective surface portion to cause resonant pivoting of said first device about said first axis to provide a resonant beam sweep;

a second mirror device comprising a second reflective surface portion for rotating about a second axis and positioned in said first path such that light reflected from said second reflective surface moves in a second direction substantially orthogonal to said first path;

a moving photosensitive medium having a first dimension and a second dimension orthogonal to said first dimension, and located to receive an image of said reflected light beam as said beam sweeps across said photosensitive medium along said first dimension, said photosensitive medium moving in a direction along said second dimension such that subsequent traces are spaced apart; and a second drive circuit for rotating said second mirror device about said second axis such that light traces are received on said moving photosensitive medium along a line substantially orthogonal to the movement of said photosensitive medium.

5. A printer comprising:

a light source providing a beam of light;

a mirror device comprising a reflective surface portion positioned to intercept said beam of light from said light source, said reflective surface supported by a first pair of torsional hinges for pivoting about a first axis and supported by a second pair of torsional hinges extending one each to first and second support anchors for pivoting about a second axis substantially orthogonal to said first axis such that pivoting of said device about said first axis results in light reflected from said reflective surface defining a first path, and pivoting of said device about said second axis results in said reflective light moving in a second direction substantially orthogonal to said first path;

a first driver for generating vibrational energy inertially coupled through said second pair of torsional hinges and through said first pair of torsional hinges to said reflective surface portion to cause resonant pivoting of said reflective surface in one direction about said first axis and then the opposite direction;

a moving photosensitive medium having a first dimension and a second dimension orthogonal to said first dimension, and located to receive an image of said reflected light beam as it sweeps or traces across said medium along said first dimension as said mirror device is resonantly pivoting about said first axis, said photosensitive medium moving in a direction along said second dimension such that an image of a subsequent trace of light is spaced from a previous trace; and a second driver for pivoting about said second axis such that traces are received on said moving photosensitive medium along a line substantially orthogonal to the movement of said photosensitive medium.

* * * * *